United States Patent [19]
McNaughton

[11] 3,888,169
[45] June 10, 1975

[54] MACHINE TOOL WITH IMPROVED LONG FLOATING JIG FIXTURE TABLE

[75] Inventor: Melville McNaughton, Ottawa, Ontario, Canada

[73] Assignee: Campeau Corporation, Ottawa, Ontario, Canada

[22] Filed: Nov. 29, 1973

[21] Appl. No.: 420,047

[52] U.S. Cl. ......... 100/100; 100/DIG. 13; 100/211; 108/64; 227/152; 269/321 F
[51] Int. Cl. .......................................... B30b 15/00
[58] Field of Search............ 100/100, 211, DIG. 13; 144/288 C; 269/321 F; 108/64, 83, 114; 227/152

[56] References Cited
UNITED STATES PATENTS

| | | | |
|---|---|---|---|
| 3,603,244 | 9/1971 | Jureit | 100/100 X |
| 3,749,391 | 7/1973 | Templin | 269/321 F |
| 3,757,681 | 9/1973 | Templin | 100/DIG. 13 |
| 3,826,188 | 7/1974 | Eberle | 100/100 |

*Primary Examiner*—Billy J. Wilhite
*Attorney, Agent, or Firm*—Spencer & Kaye

[57] ABSTRACT

Machines used in the manufacture of large components are well known and have a long steel table which is relatively flexible. Welded plates forming the table have broken at the welds partly because the support legs required too much clearance before they could be knocked down to allow passage of the travelling machine tool head reaction beam. The invention joins the plates accurately without welding, reduces the table lifting for leg clearance and simplifies construction by balancing longitudinal forces with their reaction rather than using the floor as an integral structure member.

8 Claims, 7 Drawing Figures

MACHINE TOOL WITH IMPROVED LONG FLOATING JIG FIXTURE TABLE

This invention relates to improvements in large floating tables of the type on which jigs are laid out to accommodate materials on which work is to be performed.

Such tables are well known and are built up of a number of plates laid edge to edge and side by side with longitudinal and transverse joints so that a table twelve foot wide and some considerable length is made; typically, such a table is twelve feet wide and about one hundred feet long and is made of steel plate typically half an inch thick. A marked out grid on the plates allows jig or fixture components to be located on the plates in a predetermined way to position correctly the material which is to be worked on. Provision is also made for fastening such fixtures to the table and the locating and fastening means is in the form of a grid of tapped holes on a six inch pitch along both axes. A press or some other tool for carrying out work on the material spans the table and can travel its length. Reaction to the forces exerted by the press or other tool when operating upon the material is taken by a reaction support beneath the table in the form of a beam.

It will be appreciated that a table of this size is somewhat flexible even though each twelve foot by eight foot plate is in itself reasonably flat. Thus, when the tool is travelling, hydraulic rams lift rollers just ahead of and behind the beam, and these rollers lift the table locally to clear the beam. Elsewhere the table is supported by multitude of hinged legs in rows which the beam deflects as it reaches them. The lift rollers also remove the load of the table weight from the legs nearest the beam so that the legs are free to deflect and lets the load down only when the legs have returned to the support position.

One of the major problems in such tables is the difficulties of joining the plates and maintaining the flatness of the table. Typically two adjacent plates of the table are welded together by welds which are six inches long with gaps of the same length between adjacent welds. This leads to distinct problems. Firstly, the installation is very slow, and production time is lost. Secondly, the welds themselves tend to distort the plate due to the differential heating and thirdly, as mentioned before the moving tool lifts the table as it passes to provide clearance for the legs and this flexing tends to break the welds. In addition, the very small gap compatible with sound welding does not allow adjustment of the alignment of the grid lines from one plate to the next. In normal manufacture the plates are drilled and tapped at a central manufacturing plant, shipped to the local site, and then assembled together and then welded at the local site. Despite the utmost care and expert supervision by the central manufacturing plant these welds break.

SUMMARY OF THE INVENTION

Accordingly, it is an object of the invention to eliminate the welded joints. It is also an object of the more limited aspect of the invention to support the table so that necessary movement off the plane of the supports is less than previously.

By one aspect, the invention resides in a machine for carrying out manufacturing operations on large structures comprising an elongated flexible floating table having a plurality of large rectangular metal plates laid side by side, a travelling tool means for applying a force to the upper surface of the table, said travelling tool also comprising a means for reacting the force at the under surface of the table, a multitude of deflectable support members for supporting each plate over the entire area and for allowing passage of the force reacting means, and means for joining one plate to an adjacent plate, said joining means comprising a keyway milled within the thickness of each plate, a key fitting within both keyways so as to maintain the surfaces of both plates flush and strap means securing the sides of the plates together.

The invention will best be understood by reference to the drawings and description which illustrate and describe, by way of example, one embodiment of a machine table incorporating the invention.

BRIEF DESCRIPTION OF THE DRAWINGS:

FIG. 1 shows a table 10 comprising several plates 12, 14, 16, 18 and 20 joined edge to edge to form a typical elongated table. In the illustration the table is being used to manufacture a roof truss 22 which spans about eighteen feet. The jig for making this comprises various angle irons 24, junction brackets 26 and the like which are fastened to the table by bolts screwed into five-eighths inch holes 28 tapped in the table plates on a six inch grid spacing. Connector plates with spike points uppermost are first placed at the joints, then dimensional lumber suitably cut to length is placed thereover and then further connector plates are placed spike points downwards on top of the lumber. A force applying head 30 then moves along the table until it reaches a connector plate, then stops and applies a force downwardly squeezing the two connectors on opposite sides of the lumber together into the lumber. It then moves to the next connector and carries out the same operation, and this is repeated until the whole of the truss is finished. The reaction to the downward force is, of course, met by the beam 32 beneath the table.

It will be understood that the whole table must be as accurate as possible because the grid lines are used in determining the alignment of the truss members. Also, distortion at the joints result in high and low areas on the table which when combined with table flexing result in the lumber "popping" out of the jig fixture. This "popping" is distinct from the actual failures of the welds which also occur due to the flexing of the table; the welds actually break because, of course, the weld metal not only lacks the resiliency of the plate but has the disadvantage of in-built stresses due to cooling.

Figure 1:
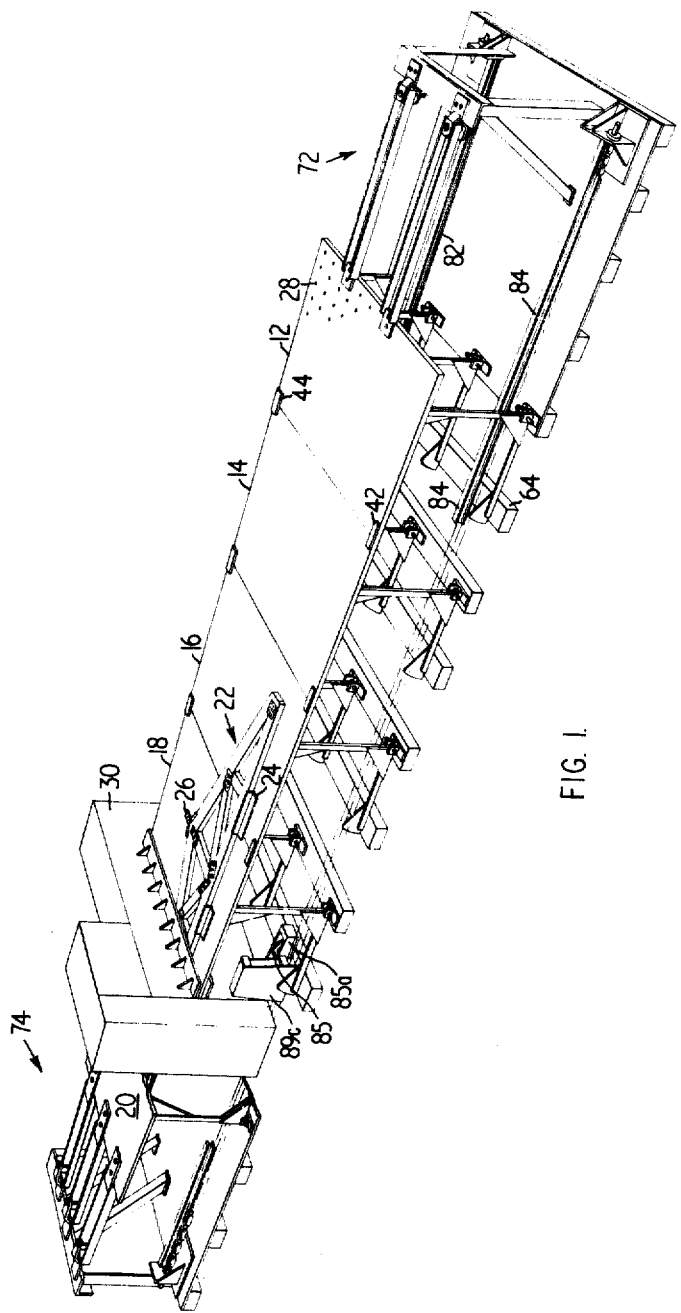
FIG. 1 is a perspective view of a large floating table.
Figure 2:
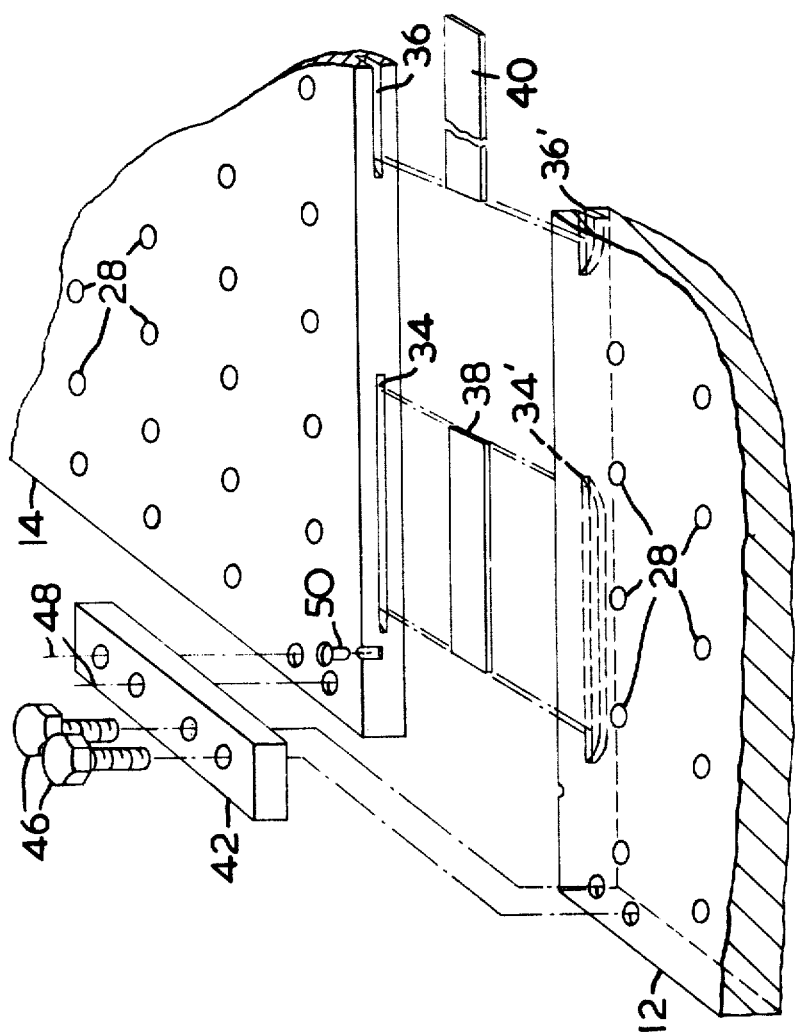
FIG. 2 shows an exploded view of a key and keyway and a strap for locating and joining two adjacent plates together.

FIG. 2 is an exploded view of a joint between plates 12 and 14. Both plates have keyways, 34, 34', 36 and 36' etc. cut in them and keys 38 and 40. For the size of table mentioned above - that is multiples of eight feet by twelve feet by half an inch thick plate - keys can be sheared from one-eighth inch thick mild steel sheet, one and seven-sixteenths of an inch wide by eleven and a half inches long, skimmed (as by surface grinding) to about 0.124 inch thickness. The plates themselves, as is well known, are available in nominal sizes, which are not accurate; the sides are not quite parallel. The dimension too is invariably larger than nominal because suppliers prefer to err by giving an over-sized dimension. Consequently, it is necessary to take a small cut — perhaps about one-quarter of an inch or so, from each of the two sides in order to bring the width of the plate — that is the axial length along the table — to within an acceptable tolerance and to make the sides parallel. This operation is carried out by a vertical spindle cutter over the full depth of the plate; then a one-eighth inch wide cutter of any suitable size is substituted to cut the keyways 34, 36 etc. three-quarters of an inch deep in each plate. These keyways are, of course, only three-quarters of an inch deep for twelve inches although the apparent length of the keyway, as viewed on the edge of the plate, is appreciably longer due to the cutter run out. Six keys on a twenty-four inch pitch have been found entirely satisfactory for maintaining flatness across the table width of two adjacent twelve foot plates.

Two straps 42, 44 secure plates 12, 14 together by means of four five-eighths diameter set screws 46, 48 which again screw directly into tapped holes in the table. Typically three inch wide straps of half inch steel plate ten inches long are entirely satisfactory. The details of assembly and the fitting of locating pin 50 will be described later below.

It will be understood that the same type of joint can be used in longitudinal welds as between two six foot by eight foot plates to make a portion of a 12 foot wide table. External straps can be accommodated in the middle of the table but a dovetail strap set flush with the table is an alternative.

The second major shortcoming of floating tables of this type has been in the way that they were supported. Previously, each of the multitude of legs was a steel pipe bent into an L shape with ceriphs which are parallel to the arms of the L and go inwardly only. As the legs turn about the hinge at the corner of the L the arc described by the end of the ceriph requires the table to be raised by the force reacting beam rollers above the height when the leg is properly vertical. This increased lift, and the subsequent lowering contribute to the "popping" and weld failures mentioned above.

Figure 3:
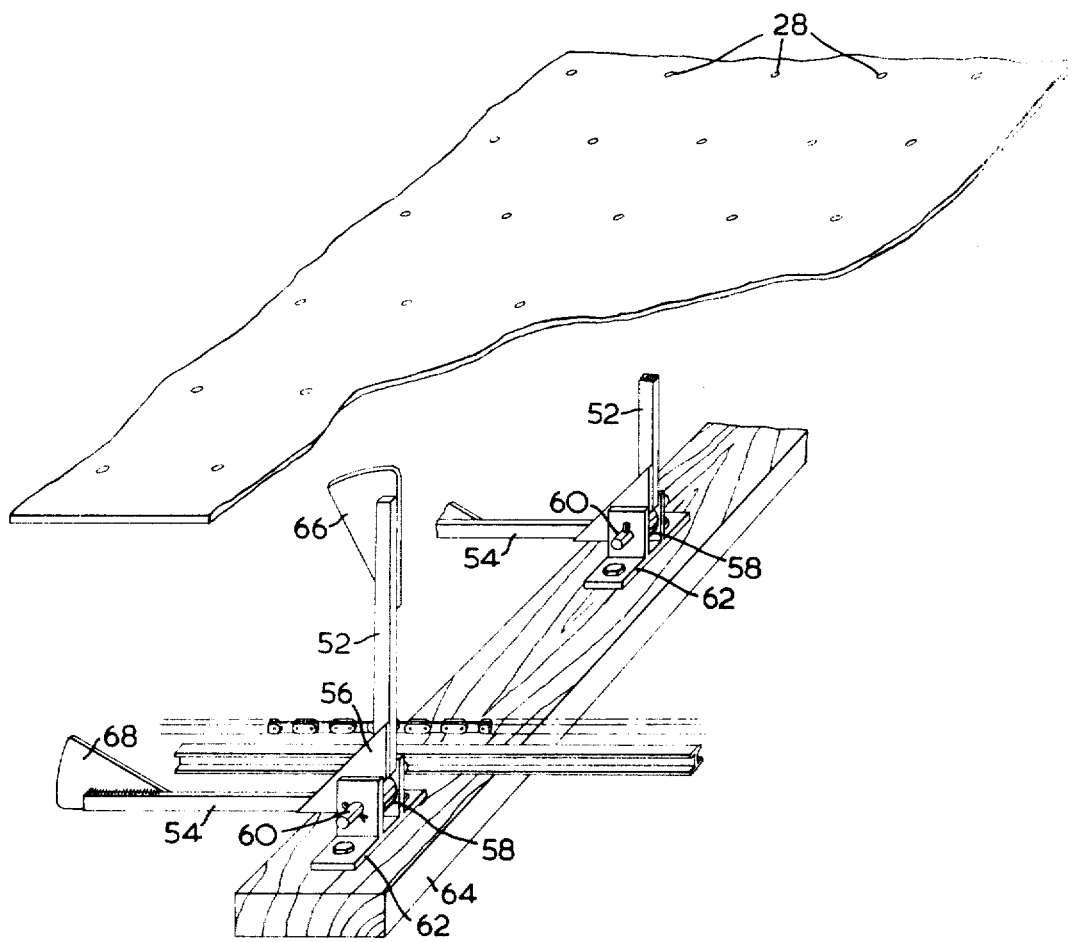
FIG. 3 shows a perspective view of a hinged leg which supports the table.
Figure 3A:
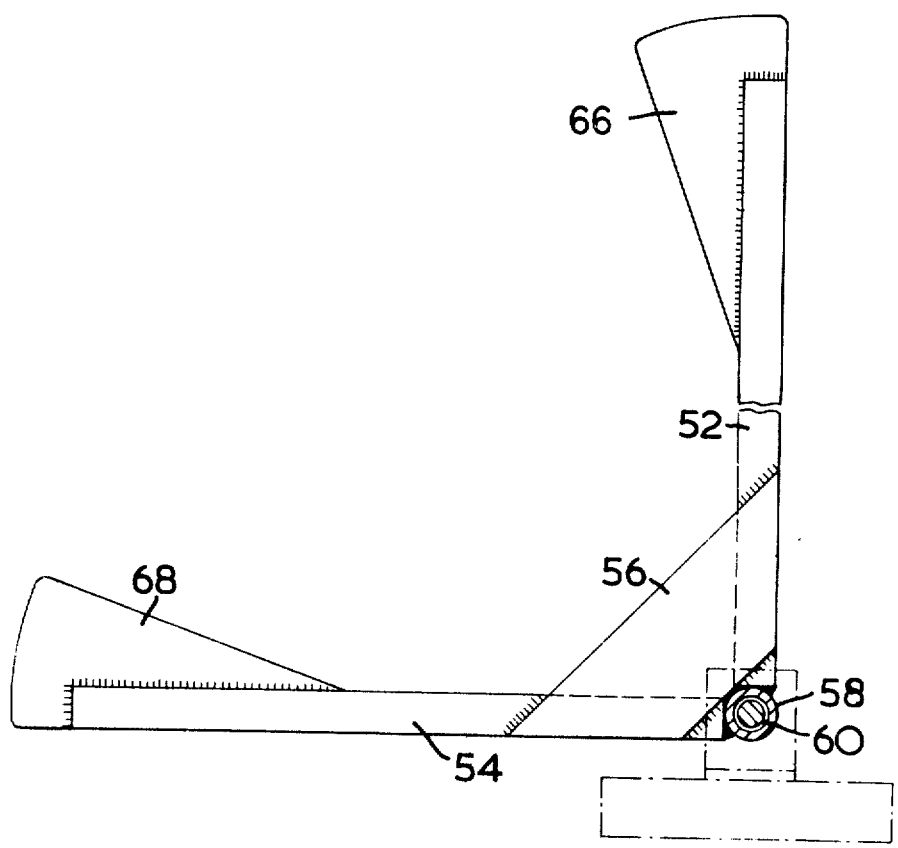
FIG. 3A is an orthogonal part section of the leg.

Such disadvantages are overcome by the use of the fabricated support shown in FIG. 3 and 3A. Square section tubes 52, 54 are welded to a corner brace 56 and a short length of pipe 58, welded to the brace and the square tubes, serves as a hinge and a steel rod 60 therethrough as the hinge pin. A bracket 62 screwed to a railraod type of tie 64 locates the hinge pin laterally and at a predetermined height. These ties enable the whole table and press to be mounted on a track which allows a much cheaper floor construction in addition to reducing the cost of laying out a multitude of support legs on a concrete floor. The plates 66, 68 welded to the square tubes 52, 54 have the top surface made circular, so that the height of the leg when partially deflected is no greater than when in the support position. The standard spacing for rows is five feet, and the ties are spaced at half this, alternate ties having no supports.

Figure 4:
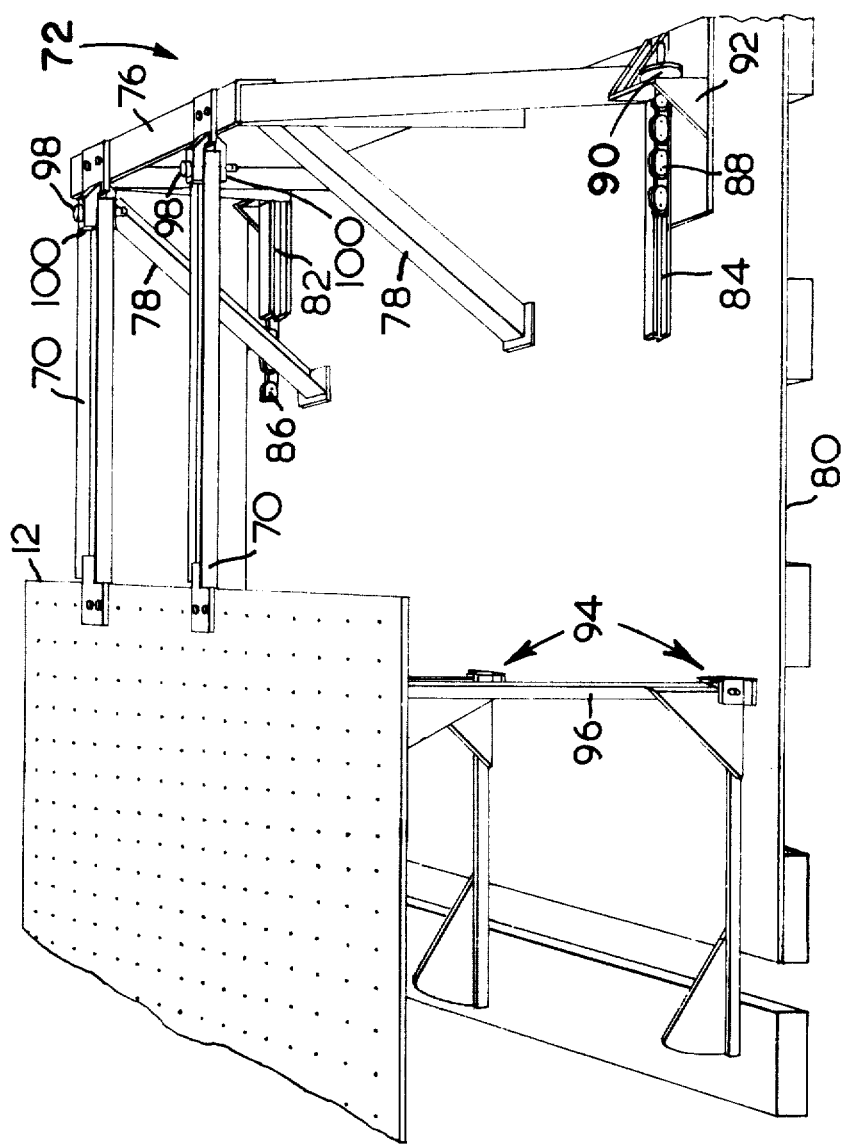
FIG. 4 shows an end support for the table.
Figure 6:
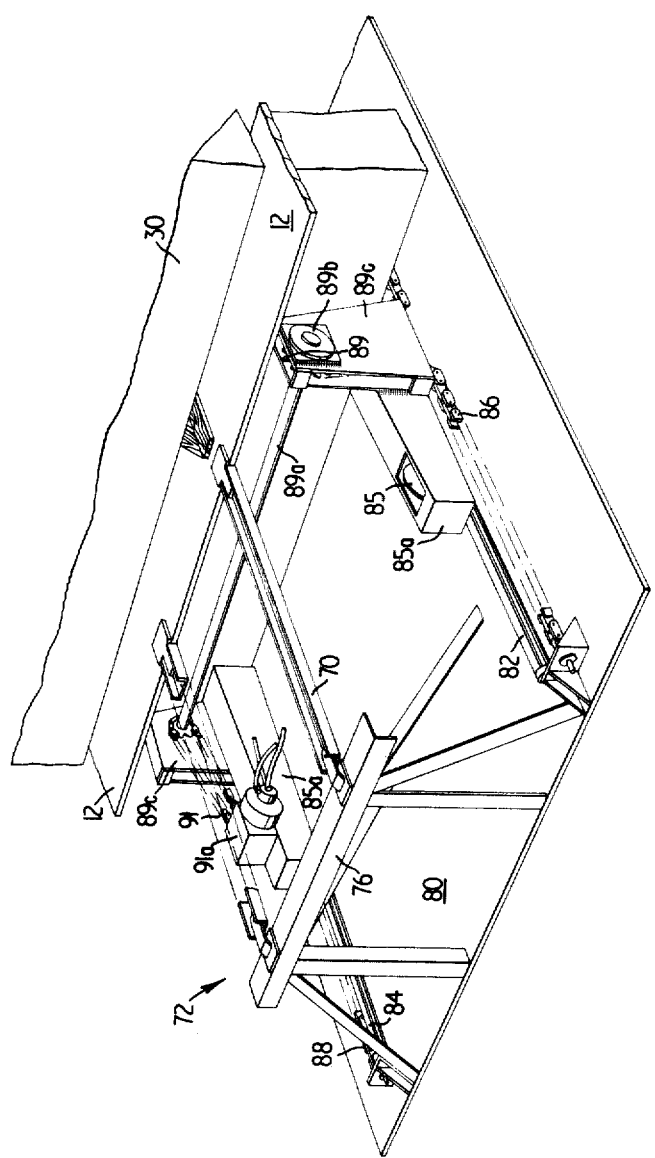
FIG. 6 shows a perspectve view of the same end of the table as shown in FIG. 4, from the other side of the machine, and also shows a portion of the press when moved near to this end support of the table.

FIG. 4 illustrates the "fixed" end structure. This is also shown in perspective view from the other side of the machine in FIG. 6, which also shows a part of the press 30 moved towards this end. This fixed end structure provides horizontal location for one end of the table but it also ensures that the forces acting on the components of the structure are reacted within the structure and are not transmitted to the floor. As will be seen the front plate 12 is bolted to channels 70; these are themselves fastened to a laterally and longitudinally braced end structure 72 having a horizontal connecting piece 76, vertical and lateral struts and longitudinal braces 78. These are all secured to a half inch steel plate 80 for reacting all the forces in the assembly. Although the press travels on rails 82, 84 which are engaged by weels 85 held in casings 85a, the rails do not supply the frictional reaction for acceleration as in a railroad; however, the rails secure the "fixed" end and the "free" end structures together, as will be explained later below. The reaction force for accelerating the press is supplied by chains 86, 88. As shown in FIG. 6, a sproket 89 on each side of the press is mounted on a common axle 89a mounted in bearings 89b held by casing 89c and is enveloped by a bite of the chain so that when the common axle is driven, the press in effect pulls itself along the chain. Axle 89a is driven by a sprocket drive 91 from motor 91a mounted on one of the casings 85a. The load on the chain is taken at the end, through a toroidal rubber ring 90 on bracket plate 92 which is bolted to the reaction plate 80. It is convenient to extend the reaction plate to the first row of supports so that the table weight will assist in holding the reaction plate in place.

To assemble the table, the ties 64, with their hinges and the two legged supports in position and an end structure 72 with the reaction plate 80 and its ties are keyed to the floor — grouting and anchor bolts are unnecessary because all forces are within the structure, as explained below. The first plate 12 is set on the legs, as by two fork lift trucks and bolted to the channels 70, of the end structure 72 of FIG. 4. The keys, 38, 40 are then inserted in keyways 36, 38 facing the next plate 14 which is approximately in position and is then eased towards the first plate. When there is a gap of about one inch between the two plates the keys are slid into the matching keyways in the second plate and little vertical adjustment is required to get the keys to register in the keyways of both plates 12, 14 together. The second plate 14 is then pulled home and the straps 42, 44 loosely bolted to both plates. The other plates, 16, 18 and 20 are similarly installed.

After all plates have been thus approximately assembled together the grid can be aligned very accurately as between one plate and its neighbor by opening or closing any gaps between the plates. With ordinary care taken in machining the sides the plates to be parallel and to size, the largest gap between adjacent plates for adjusting the alignment is approximately one-eighth of an inch between abutting edges. The bolts 46, 48 are tightened up and five-sixteenth holes drilled directly on the joints adjacent to the edge straps so that approximately half the hole is in each plate. This five-sixteenth hole is then filled with the five-sixteenth locating pin 50 mentioned above which thus acts as a shaft locating the two edges of the plate accurately so that transverse horizontal alignment is fixed.

In operation, it will be understood that when the press is accelerated by the motor the accelerating force is supplied through tension in chains 86, 88 and transferred through the reaction plate 80 into the remainder of the structure. If it should happen that the operator makes a mistake and attempts to move the press before disengaging it from the table the resulting thrust or pull in the table would be transferred from the end structure through the reaction plate and the brackets where it will be taken by the chain tension. In practice, even if there is a failure of an interlock, or of an excess pressure valve, building foundations will not be damaged.

In FIG. 4 the channels are bolted to the table and engage with pins 98 in the end structure. It will be understood that at this "fixed" end, the holes in channels 70 are slightly oversize for some freedom of vertical movement, because the channels are secured to the end horizontal member 76 through clevises 100 which hold pin 98 and that an up and down flexing movement of about two inches can be easily accommodated.

Figure 5:
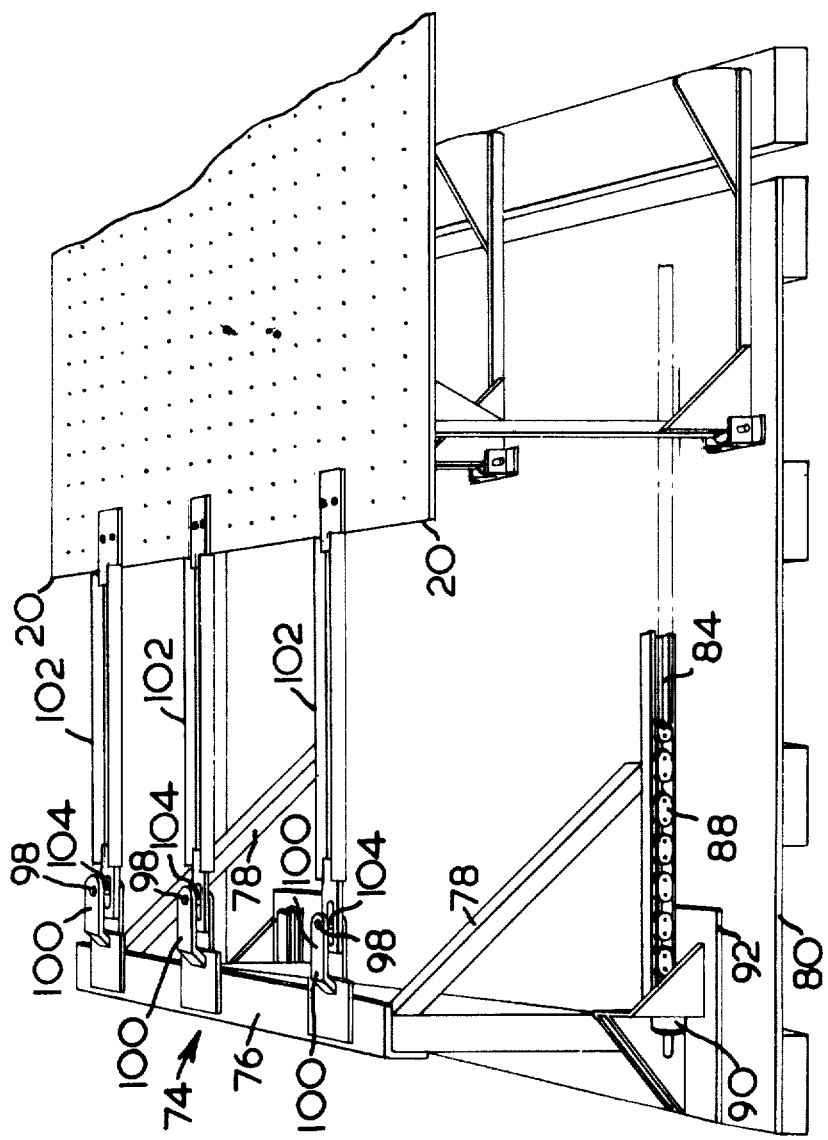
FIG. 5 shows another end support.

At the other end of the table, the "free" end, 74, the arrangements are much the same as can be seen in FIG. 5 where like components are identified by like numbers except that the channels members 102 have an elongated hole 104 in them so that they do not function as a strut or a tie but still allow two inches or so of vertical movement. The reason for the elongated hole, of course, is that there is a considerable amount of thermal expansion in a table which is effectively one hundred and four feet long. The channels at both ends have a further function in that they allow the press to be moved beyond the end of the table proper, at each end, in order to allow servicing and maintenance to be carried out on the press at both front and rear. The channels lift the end of the table to the proper height so that it will clear the reaction beam 32 as the press returns to the table from the maintenance area. The function of the rails will probably be evident; if the press is accelerated towards the free end the reaction is transmitted as a pull on the chains at that end, thence through the bracket plates 92, rails 82, 84 to the fixed end and thence to the table. All these measures allow the manufacture of very long floating tables which are much more trouble free than those conventionally available.

While there has been shown and described what is at present considered the preferred embodiment of the invention, it will be obvious to those skilled in the art that various changes and modifications may be made therein without departing from the invention as defined by the appended claims.

I claim:

1. A machine for carrying out manufacturing operations on large structures comprising:
   elongated flexible floating table having;
   a plurality of large rectangular metal plates laid side by side;
   a travelling tool means for applying a force to the upper surface of the table, said travelling tool also comprising a means for reacting the force at the under surface of the table;
   a multitude of deflectable support members for supporting each plate over the entire area and for allowing passage of the force reacting means; and
   means for joining one plate to an adjacent plate, said joining means comprising a keyway milled within the thickness of each plate, a key fitting within both keyways so as to maintain the surfaces of both plates flush and strap means securing the edges of the plates together.

2. A machine as claimed in claim 1 and further comprising transverse alignment means between the sides of adjacent plates to facilitate alignment and spacing of a coordinate locating grid throughout the whole table.

3. A table as claimed in claim 1 wherein the key is of mild sheet steel stock.

4. A machine as claimed in claim 1 wherein each deflectable support member comprises two coplanar legs of flat sided steel stock material at right angles to one another wherein both legs at one end are welded to a short length of pipe orthogonal to the plane, the pipe thus forming a hinge movable member and two plates welded, one to each leg, at the other end, each plate having a profile at the distal end such that the table does not require excess lifting before the support is free to turn about a hinge pin without interference from the table.

5. A machine as claimed in claim 1 in which the deflectable support members are secured to railroad type ties.

6. A machine as claimed in claim 4 wherein hinge bracket members for the plate support members are secured to railroad type ties.

7. A machine as claimed in claim 1 and further comprising a reaction means at one end of the table, means for longitudinally securing the reaction means to the table, and means for attaching the reaction means to a means for applying a force to move the travelling tool means.

8. A machine as claimed in claim 7 wherein the means for longitudinally securing the reaction means to the table comprises structural members long enough to permit the travelling tool means to travel far enough to be completely free of the table, to facilitate servicing of the travelling tool means.

* * * * *